(12) United States Patent
Kim et al.

(10) Patent No.: US 12,680,816 B2
(45) Date of Patent: Jul. 14, 2026

(54) DEVICE AND METHOD FOR SETTING LINE WITHIN POLYGONSERVICE AREA

(71) Applicant: 42DOT INC., Seoul (KR)

(72) Inventors: Hyun Seok Kim, Seongnam (KR); Min Cheol Kim, Seoul (KR); Se Il Jeong, Seoul (KR)

(73) Assignee: 42DOT INC., Seoul (KR)

( * ) Notice: Subject to any disclaimer, the term of this patent is extended or adjusted under 35 U.S.C. 154(b) by 242 days.

(21) Appl. No.: 18/307,878

(22) Filed: Apr. 27, 2023

(65) Prior Publication Data

US 2024/0094013 A1 Mar. 21, 2024

(30) Foreign Application Priority Data

Apr. 29, 2022 (KR) .......................... 10-2022-0053864

(51) Int. Cl.
*G01C 21/34* (2006.01)
*G01C 21/00* (2006.01)

(52) U.S. Cl.
CPC ..... *G01C 21/3415* (2013.01); *G01C 21/3867* (2020.08)

(58) Field of Classification Search
CPC ........................ G01C 21/3414; G01C 21/3867
See application file for complete search history.

(56) References Cited

U.S. PATENT DOCUMENTS

2018/0328745 A1* 11/2018 Nagy ................... G05D 1/0219
2023/0061528 A1* 3/2023 Stenneth ............ G01C 21/3841

FOREIGN PATENT DOCUMENTS

| | | |
|---|---|---|
| JP | 2020074169 A | 5/2020 |
| KR | 101695557 B1 | 1/2017 |
| KR | 101903660 B1 | 10/2018 |
| KR | 20190039361 A | 4/2019 |
| KR | 20190076267 A | 7/2019 |
| KR | 102109779 B1 | 5/2020 |
| KR | 102268397 B1 | 6/2021 |
| KR | 20210096709 A | 8/2021 |
| KR | 20210128150 A | 10/2021 |

* cited by examiner

*Primary Examiner* — Adnan M Mirza
(74) *Attorney, Agent, or Firm* — Harvest IP Law, LLP

(57) ABSTRACT

Provided are a method and device for providing an in-vehicle interface. The method may provide a first interface before driving of a vehicle, a second interface after the driving of the vehicle starts, and a third interface after completion of the driving of the vehicle.

15 Claims, 14 Drawing Sheets

Figure 7:
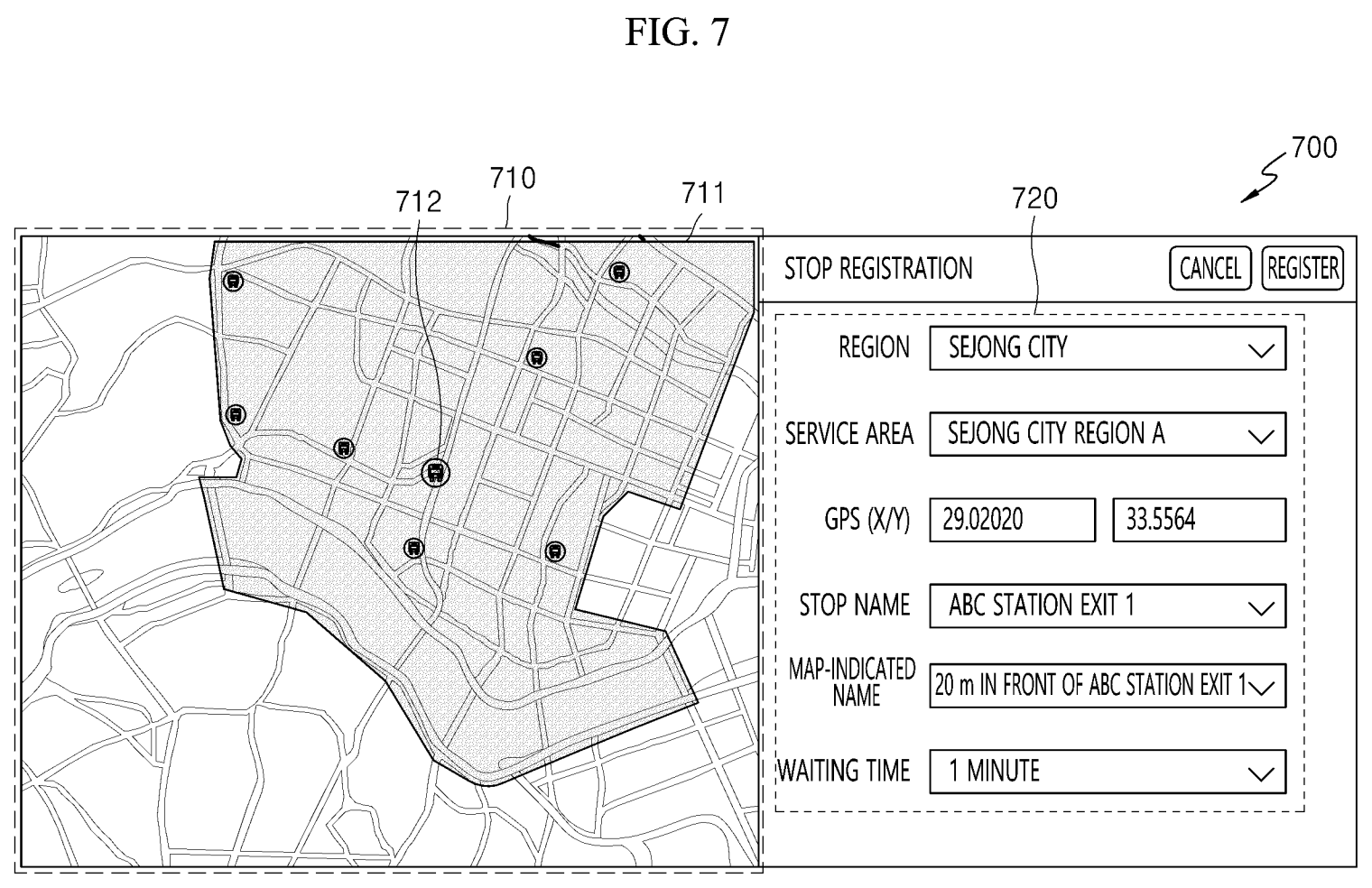

STOP REGISTRATION    CANCEL  REGISTER

720

| REGION | SEJONG CITY | ⟩ |
| SERVICE AREA | SEJONG CITY REGION A | ⟩ |
| GPS (X/Y) | 29.02020 | 33.5564 |
| STOP NAME | ABC STATION EXIT 1 | ⟩ |
| MAP-INDICATED NAME | 20 m IN FRONT OF ABC STATION EXIT 1 | ⟩ |
| WAITING TIME | 1 MINUTE | ⟩ |

Figure 8:
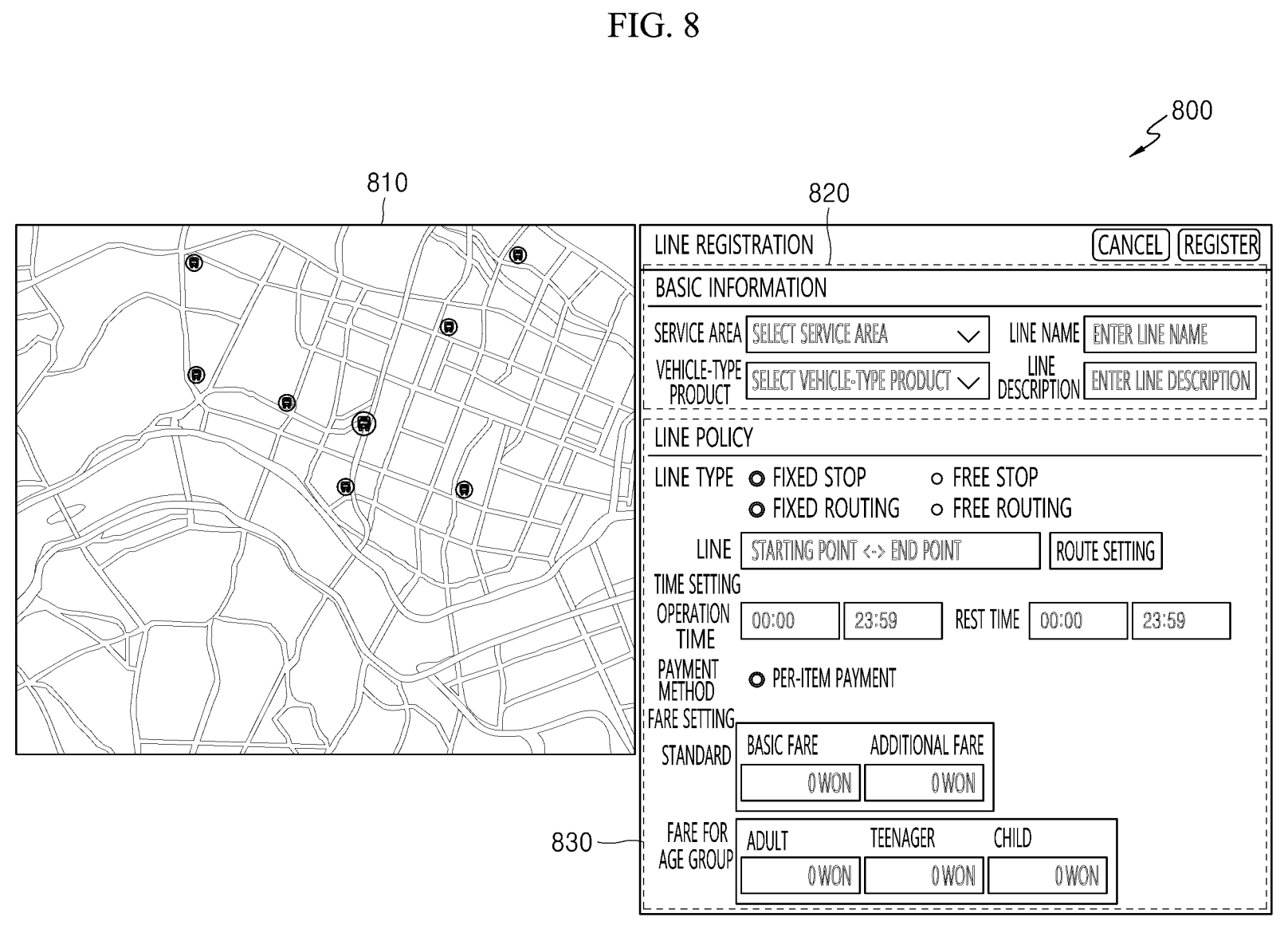

LINE REGISTRATION    CANCEL   REGISTER

BASIC INFORMATION

SERVICE AREA   SELECT SERVICE AREA   >

VEHICLE-TYPE PRODUCT   SELECT VEHICLE-TYPE PRODUCT   >

LINE NAME   ENTER LINE NAME

LINE DESCRIPTION   ENTER LINE DESCRIPTION

LINE POLICY

LINE TYPE   ● FIXED STOP   ○ FREE STOP

○ FIXED ROUTING   ○ FREE ROUTING

LINE   STARTING POINT <-> END POINT   ROUTE SETTING

TIME SETTING

OPERATION TIME   00:00   23:59    REST TIME   00:00   23:59

PAYMENT METHOD   ● PER-ITEM PAYMENT

FARE SETTING

STANDARD   BASIC FARE    ADDITIONAL FARE

FARE FOR AGE GROUP

ADULT   0 WON   0 WON

TEENAGER   0 WON   0 WON

CHILD   0 WON   0 WON

ALLOCATED VEHICLES Register/Delete

1110

LIST OF REGISTRABLE VEHICLES                    30 VEHICLES

| VEHICLE ID | LICENSE PLATE NUMBER | COMPANY NAME | VEHICLE PRODUCT |
|---|---|---|---|
| ☐ 00001 | SEOUL00A0001 | ABC COMPANY | Bus |
| ☐ 00002 | SEOUL00A0002 | ABC COMPANY | Bus |
| ☐ 00003 | SEOUL00A0003 | ABC COMPANY | Bus |
| ☐ 00004 | SEOUL00A0004 | ABC COMPANY | Bus |
| ☐ 00005 | SEOUL00A0005 | ABC COMPANY | Bus |
| ☐ 00011 | SEOUL00A0011 | ABC COMPANY | DRT |
| ☐ 00012 | SEOUL00A0012 | ABC COMPANY | DRT |
| | | | |

1120

LIST OF ALLOCATED VEHICLES                    5 VEHICLES

| VEHICLE ID | LICENSE PLATE NUMBER | COMPANY NAME | VEHICLE PRODUCT |
|---|---|---|---|
| ☐ 00001 | SEOUL00A0001 | ABC COMPANY | Bus |
| ☐ 00002 | SEOUL00A0002 | ABC COMPANY | Bus |
| ☐ 00003 | SEOUL00A0003 | ABC COMPANY | Bus |
| | | | |
| | | | |
| | | | |
| | | | |

CANCEL    SAVE

DEVICE AND METHOD FOR SETTING LINE WITHIN POLYGONSERVICE AREA

CROSS-REFERENCE TO RELATED APPLICATION

This application is based on and claims priority under 35 U.S.C. § 119 to Korean Patent Application No. 10-2022-0053864, filed on Apr. 29, 2022, in the Korean Intellectual Property Office, the disclosure of which is incorporated by reference herein in its entirety.

BACKGROUND

1. Field

The present disclosure relates to a device and method for setting a line within a polygon service area.

2. Description of the Related Art

Conventional transportation vehicles include buses, subways, taxis, and the like, and buses and subways charge inexpensive fares but have the inconvenience of having to go to a designated area at a designated time, whereas taxis allow passengers to get on and off wherever they want, but charge expensive fares.

In general cities, it is possible to freely use transportation vehicles such as buses, subways, or taxis, however, in remote areas such as rural areas, accessibility to conventional transportation vehicles is poor because, for example, no taxis are operating or buses travel their routes only 3 or 4 times a day in such areas.

Demand-responsive transportation (DRT) is emerging as a transportation method that has the advantages of the conventional transportation vehicles and remedies the disadvantages. The demand-responsive transportation refers to a transportation method of flexibly managing operation sections, operation frequencies, operation times, and the like without fixed lines, according to passenger demand.

Recently, research on a method of more efficiently operating a demand-responsive transportation system is required.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided are a device and method for setting a line within a polygon service area. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure may be implemented by means provided in the claims and a combination thereof.

Additional aspects will be set forth in part in the description which follows and, in part, will be apparent from the description, or may be learned by practice of the presented embodiments of the disclosure.

According to a first aspect of the present disclosure, a method of setting a line within a polygon service area includes obtaining coordinate information about a plurality of points on a map, setting a polygon service area by using the obtained coordinate information, and setting a line within the polygon service area.

According to a first aspect of the present disclosure, a device for setting a line within a polygon service area includes a memory storing at least one program, and a processor configured to executing the at least one program to perform an operation, wherein the processor is further configured to obtain coordinate information about a plurality of points on a map, set a polygon service area by using the obtained coordinate information, set a stop within the polygon service area, and set a line within the polygon service area by using the stop.

According to a third aspect of the present disclosure, a computer-readable recording medium may have recorded thereon a program for executing, on a computer, the method according to the first aspect.

In addition, other methods and systems for implementing the present disclosure, and a computer-readable recording medium having recorded thereon a computer program for executing the methods may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is an exemplary diagram for describing a method of setting a stop within a polygon service area, according to an embodiment;

FIG. 8 is an exemplary diagram for describing a method of setting a line within a polygon service area by using a stop, according to an embodiment;

FIG. 11 is an exemplary diagram for describing a method of allocating a vehicle to a set line according to an embodiment;

DETAILED DESCRIPTION

Figure 1:
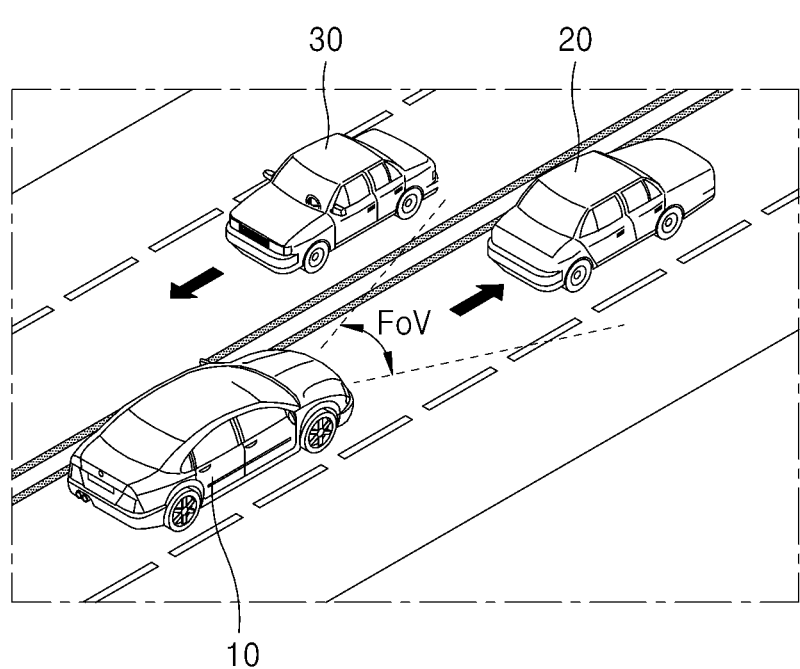
FIG. 1 is a diagram for describing an autonomous driving method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression may include a plural expression unless they are definitely different in a context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the term 'vehicle' may refer to all types of transportation instruments with engines that are used to move passengers or goods, such as cars, buses, motorcycles, kick scooters, or trucks.

Hereinafter, the term 'line' encompasses 'route' and 'stop'. That is, the term 'route' does not encompass 'stop'.

Hereinafter, the present disclosure will be described in detail with reference to the accompanying drawings.

FIG. 1 is a diagram for describing an autonomous driving method according to an embodiment.

Referring to FIG. 1, an autonomous driving apparatus according to an embodiment of the present disclosure may be mounted on a vehicle to implement an autonomous vehicle 10. The autonomous driving apparatus mounted on the autonomous vehicle 10 may include various sensors configured to collect situational information around the autonomous vehicle 10. For example, the autonomous driving apparatus may detect a movement of a preceding vehicle 20 traveling in front of the autonomous vehicle 10, through an image sensor and/or an event sensor mounted on the front side of the autonomous vehicle 10. The autonomous driving apparatus may further include sensors configured to detect, in addition to the preceding vehicle 20 traveling in front of the autonomous vehicle 10, another traveling vehicle 30 traveling in an adjacent lane, and pedestrians around the autonomous vehicle 10.

At least one of the sensors configured to collect the situational information around the autonomous vehicle may have a certain field of view (FoV) as illustrated in FIG. 1. For example, in a case in which a sensor mounted on the front side of the autonomous vehicle 10 has a FoV as illustrated in FIG. 1, information detected from the center of the sensor may have a relatively high importance. This may be because most of information corresponding to the movement of the preceding vehicle 20 is included in the information detected from the center of the sensor.

The autonomous driving apparatus may control the movement of the autonomous vehicle 10 by processing information collected by the sensors of the autonomous vehicle 10 in real time, while storing, in a memory device, at least part of the information collected by the sensors.

Figure 2:
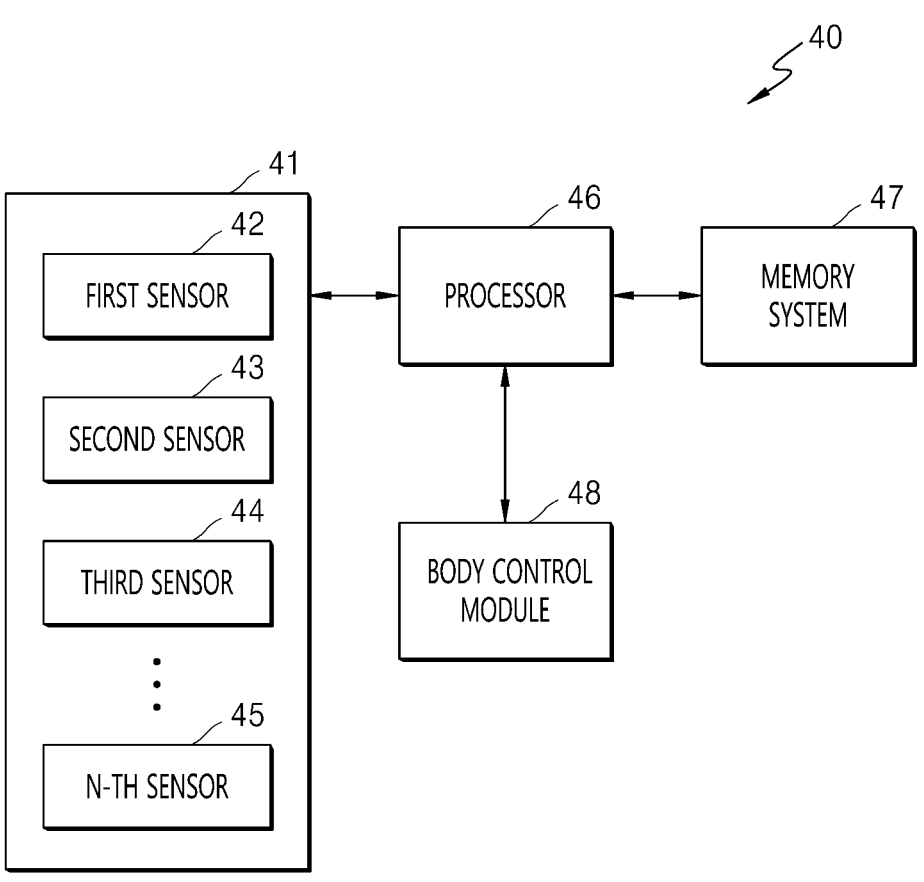
FIG. 2 is a block diagram illustrating hardware units included in an autonomous driving device according to an embodiment.

FIG. 2 is a block diagram illustrating hardware units included in an autonomous driving device according to an embodiment.

Referring to FIG. 2, an autonomous driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine the movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

Figure 3:
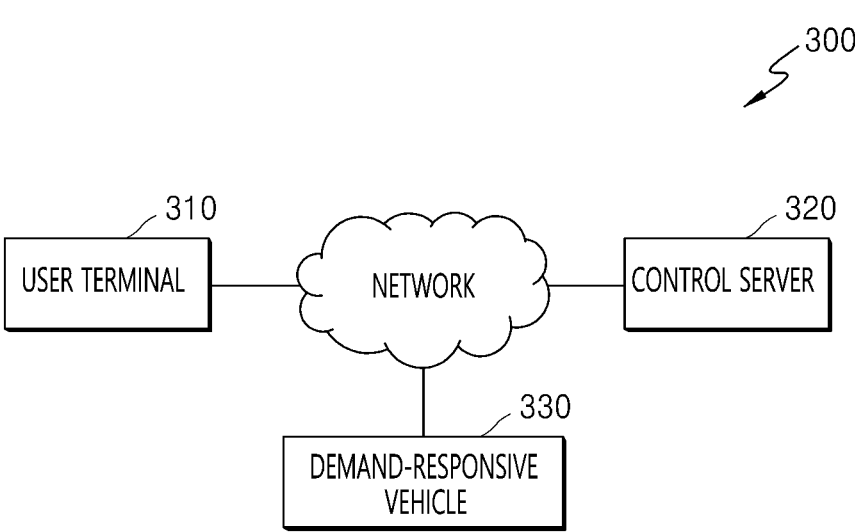
FIG. 3 is a diagram for describing a demand-responsive transportation system according to an embodiment.

FIG. 3 is a diagram for describing a demand-responsive transportation system according to an embodiment.

The demand-responsive transportation (DRT) refers to a transportation method of flexibly managing operation sections, operation frequencies, operation times, and the like without fixed lines, according to passenger demand.

The demand-responsive transportation may be classified into various types according to a line operation method. For example, a fixed-line type refers to a type in which all of operation times, stops, and starting points and end points of lines are fixed. An off-route type refers to a type in which operation times and starting points and end points of lines are fixed, but a new stop may be set according to reservation by a user, in addition to fixed stops. A quasi-dynamic type refers to a type in which starting points and end points of lines are fixed, but only departure and arrival times among operation times are fixed, and stops other than the starting points and end points of the lines may be freely set. A dynamic type refers to a type in which all of operation times, stops, and starting points and end points of lines are not fixed.

In addition, the demand-responsive transportation may be classified into various types according to starting points and end points of lines. For example, a one-to-one type refers to a type in which lines have difference starting points and different end points. In addition, a one-to-many type refers to a type in which lines have the same starting point and different end points, and a many-to-one type refers to a type in which lines have different starting points and the same end point. In addition, a many-to-many type refers to a type in which lines do not have particular starting points and end points, and may be changed according to circumstances or needs.

Referring to FIG. 3, a demand-responsive transportation system 300 may include a user terminal 310, a control server 320, and a demand-responsive vehicle 330.

The user terminal 310 may be, but is not limited to, a smart phone, a tablet personal computer (PC), a PC, a smart television (TV), a mobile phone, a personal digital assistant (PDA), a laptop computer, a media player, a microserver, a global positioning system (GPS) device, an electronic book terminal, and a digital broadcasting terminal, a navigation system, a kiosk, an MP3 player, a digital camera, a home appliance, a device equipped with a camera, or any one of other mobile or nonmobile computing devices. In addition, the user terminal 310 may be a wearable device having a communication function and a data processing function, such as a watch, glasses, a hair band, or a ring. However, the present disclosure is not limited thereto.

The control server 320 refers to a server that performs a control function for operating demand-responsive transportation. The demand-responsive vehicle 330 refers to a vehicle that is allocated according to passenger demand, and the operation section, operation frequency, operation times, and the like of which are determined according to the method of operating the demand-responsive transportation.

The user terminal 310, the control server 320, and the demand-responsive vehicle 330 may perform communication by using a network. For example, the network may include a local area network (LAN), a wide area network (WAN), a value-added network (VAN), a mobile radio communication network, a satellite communication network, and a combination thereof, may be a comprehensive data communication network that allows each network constituent entity illustrated in FIG. 3 to perform seamless communication with each other, and may include a wired Internet network, a wireless Internet network, and a mobile wireless communication network. In addition, the wireless communication may include, but is not limited to, a wireless LAN (e.g., Wi-Fi), Bluetooth, Bluetooth Low Energy, Zigbee, Wi-Fi Direct (WFD), ultra-wideband (UWB), Infrared Data Association (IrDA), and near-field communication (NFC).

The user terminal 310 may access the control server 320 through the network, and transmit, to the control server 320, information such as a departure time, a departure point, and a destination. The control server 320 may check information of the demand-responsive vehicle 330 registered therein to perform an allocation process. For example, the control server 320 may compare the departure point of the user terminal 310 with the current location of the demand-responsive vehicle 330, and allocate the demand-responsive vehicle 330 that may arrive at the departure point of the user terminal 310 fastest. The control server 320 may transmit allocation information to the user terminal 310 and the demand-responsive vehicle 330 through the network.

Figure 4:
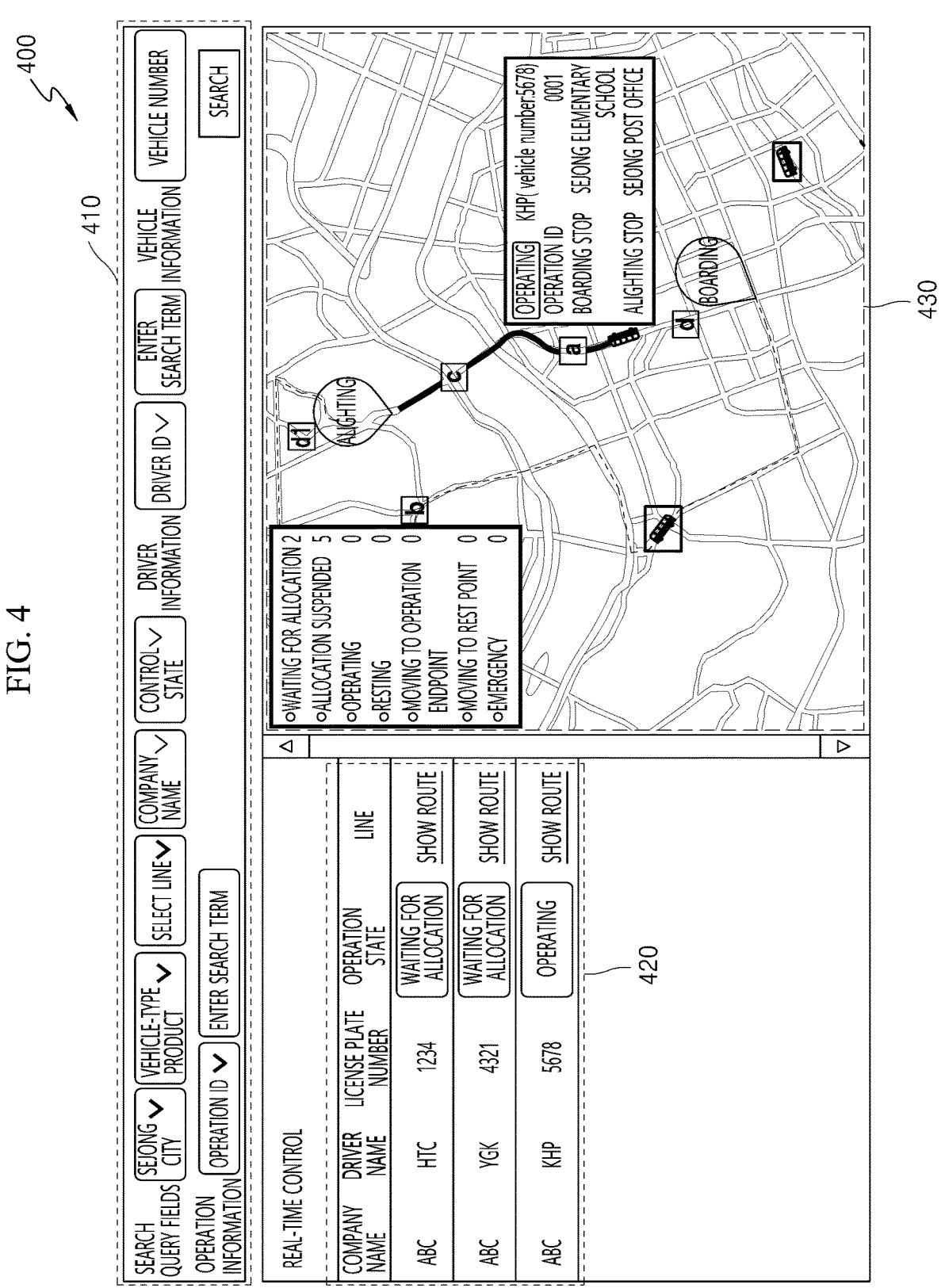
FIG. 4 is an exemplary diagram for describing a control function performed by a control server according to an embodiment.

FIG. 4 is an exemplary diagram for describing a control function performed by a control server according to an embodiment.

The control server refers to a server capable of controlling a plurality of demand-responsive vehicles operated under control by a demand-responsive transportation system. Information about a plurality of companies providing a demand-responsive transportation service may be registered in the control server. In addition, information about a plurality of vehicles operated by each company and information about a plurality of drivers registered in each company may be registered in the control server.

FIG. 4 illustrates a user interface 400 provided to a manager by the control server. Referring to the user interface 400, the manager may set various conditions for searching for a demand-responsive vehicle by interacting with objects included in a first area 410. For example, by interacting with the objects included in the first area 410, the manager may set conditions for an operation region, an operating company, a vehicle-type product, a line, and a control state. In addition, by interacting with the objects included in the first area 410, the manager may set conditions for driver information, vehicle information, and operation information.

In response to the manager setting the conditions for searching for a demand-responsive vehicle, the control server may display, in a second area 420, detailed information about demand-responsive vehicles that satisfy the set conditions. Information about company names, driver names, license plate numbers, operation states, and lines of the demand-responsive vehicles that satisfy the set conditions may be displayed in the second area 420, but the information displayed in the second area 420 is not limited thereto. For example, in response to the manager setting conditions to specify the operation region as 'Sejong City' and the company name as 'ABC', the control server may display information about driver names, license plate numbers, control states, and lines of demand-responsive vehicles of company 'ABC' operating in 'Sejong City'.

In addition, in response to the manager setting the conditions for searching for the demand-responsive vehicle, the control server may display, in a third area 430, operation information about the demand-responsive vehicles that satisfy the set conditions. Information about the operation states (e.g., waiting for allocation, allocation suspended, operating, resting, etc.), moving paths, and current locations of the demand-responsive vehicles that satisfy the set conditions may be displayed in the third area 430, but the information displayed in the third area 430 is not limited thereto.

Meanwhile, the manager may select a certain demand-responsive vehicle by interacting with the objects included in the second area 420. In response to the manager selecting a certain demand-responsive vehicle, the control server may display, in the third area 430, a boarding point, an alighting point, and a remaining moving path of the selected demand-responsive vehicle.

The control server may store information about companies providing demand-responsive transportation services, information about a plurality of vehicles operated by each company, and information about a plurality of drivers registered in each company. In addition, the control server may improve the control accuracy and convenience of the manager by processing the stored information and providing the processed information in the form of a user interface to the manager using the control server.

Meanwhile, although FIG. 4 illustrates, for convenience of description, that the first area 410, the second area 420, and the third area 430 are displayed in one interface, the areas may be displayed in different interfaces.

A device for setting a line within a polygon service area (hereinafter, referred to as a 'line setting device') to be described below may refer to a control server.

Figure 5:
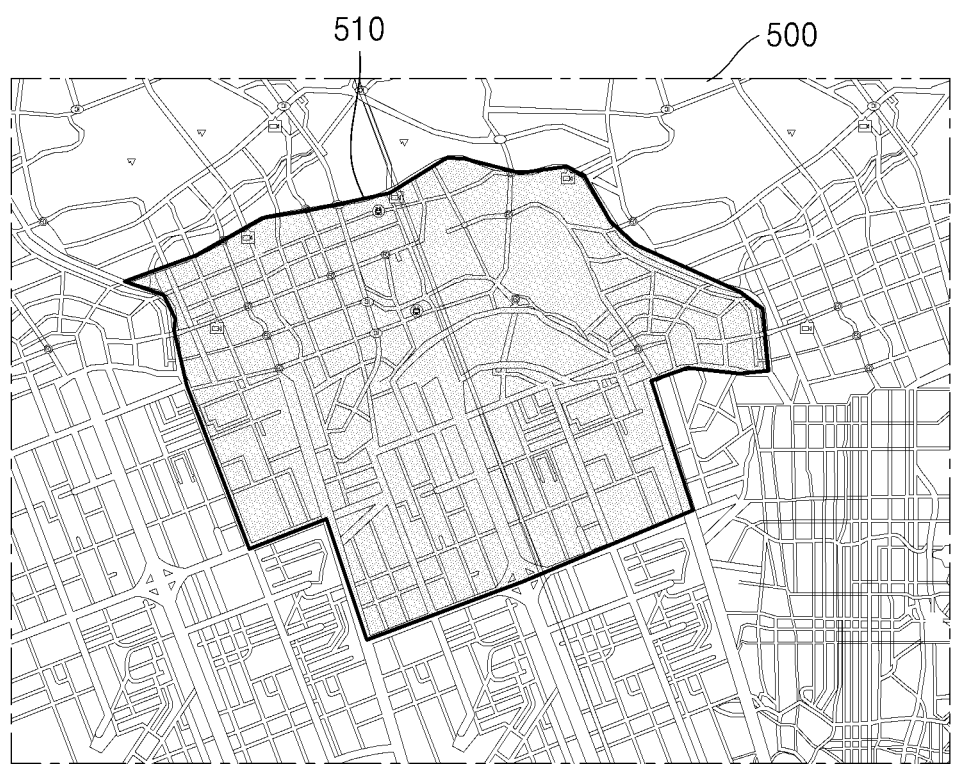
FIG. 5 is an exemplary diagram for describing a method of setting a polygon service area according to an embodiment.

FIG. 5 is an exemplary diagram for describing a method of setting a polygon service area according to an embodiment.

The line setting device may obtain coordinate information about a plurality of points on a map 500. The line setting device may set a polygon service area 510 by using the obtained coordinate information.

In an embodiment, the line setting device may receive a user input for specifying a plurality of points on the map. The line setting device may obtain coordinate information corresponding to the plurality of specified points and set the polygon service area 510 by using the obtained coordinate information.

In another embodiment, the line setting device may receive a user input for selecting a particular region (e.g., city, county, district, etc.). The line setting device may obtain coordinate information corresponding to the selected region and set the polygon service area 510 by using the obtained coordinate information.

Referring to FIG. 5, the polygon service area 510 is shaded on the map 500. The polygon service area 510 may be set in various sizes and shapes according to the obtained coordinate information.

As described below, the line setting device may set a plurality of stops and a plurality of lines for each of a plurality of polygon service areas 510 set on the map 500. Thereafter, in response to receiving a boarding request message from a user terminal, the line setting device may obtain location information of the user terminal included in the boarding request message. The line setting device may determine a certain polygon service area 510 corresponding to the location of the user terminal, from among the plurality of polygon service areas 510. Also, the line setting device may determine vehicle allocation information based on the plurality of stops and the plurality of lines set in the determined polygon service area 510, and transmit the determined vehicle allocation information to the user terminal.

Figure 6:
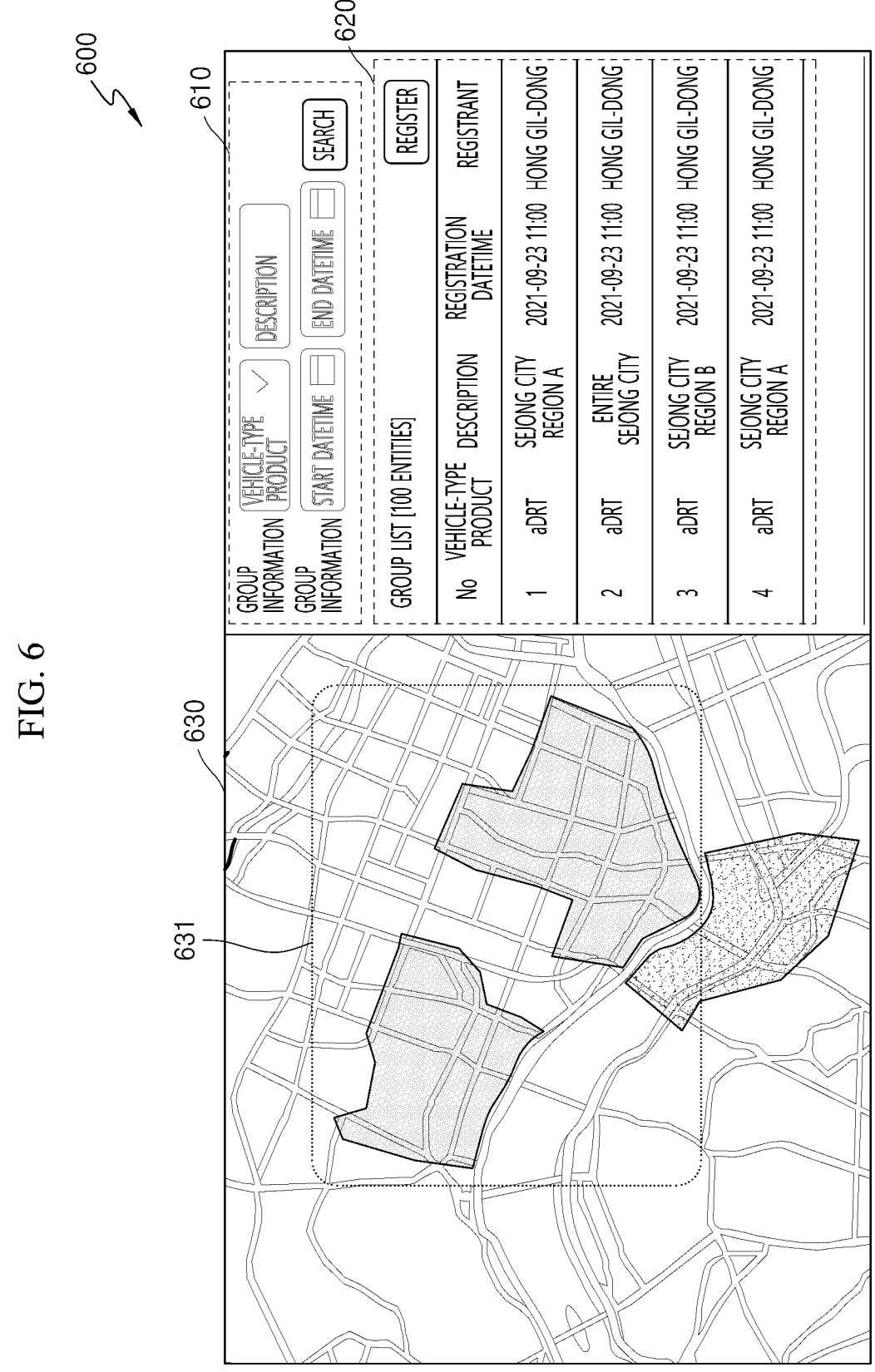
FIG. 6 is an exemplary diagram for describing information set for each polygon service area, according to an embodiment.

FIG. 6 is an exemplary diagram for describing information set for each polygon service area, according to an embodiment.

Referring to FIG. 6, a line setting device may provide a first interface 600 for retrieving and displaying information set for a polygon service area. The first interface 600 may include at least one of a 1-1st area 610, a 1-2nd area 620, and a 1-3rd area 630.

The 1-1st area 610 may include an input window for setting various conditions for searching for a polygon service area. The line setting device may receive, through the 1-1st area 610, an input for searching for at least one of a region, a service area name, a vehicle-type product, and time of registration.

Information about a polygon service area corresponding to the input received through the 1-1st area 610 may be displayed in the 1-2nd area 620 and the 1-3rd area 630. In detail, detailed information about the polygon service area may be displayed in the 1-2nd area 620, and map information about the polygon service area may be displayed in the 1-3rd area 630.

The line setting device may determine a polygon service area corresponding to the input received through the 1-1st area 610, from among a plurality of polygon service areas stored in a database. For example, in response to receiving an input for searching for 'DRT' as a vehicle-type product, the line setting device may output and display, in the 1-2nd area 620, a polygon service area registered with 'DRT' as a vehicle-type product, among a plurality of set polygon service areas.

The line setting device may display, in the 1-2nd area 620, detailed information about the determined polygon service area. Information about a service area name, a vehicle-type product, and time of registration regarding the determined polygon service area may be displayed in the 1-2nd area 620.

In addition, the line setting device may display, in the 1-3rd area 630, map information about the determined polygon service area. A region corresponding to the determined polygon service area may be displayed on a map in the 1-3rd area 630. Referring to the 1-3rd area 630 of FIG. 6, the region corresponding to the determined polygon service area is shaded on the map.

Meanwhile, it is also possible to search for a polygon service area through the 1-3rd area 630. In an embodiment, the line setting device may receive a region designation input for selecting at least a partial region 631 on the map displayed in the 1-3rd area 630. For example, the region designation input may be a mouse drag input. The line setting device may identify a preset polygon service area included in the at least a partial region 631. The line setting device may display, in the 1-2nd area 620, detailed information about the identified polygon service area, among the plurality of polygon service areas stored in the database.

FIG. 7 is an exemplary diagram for describing a method of setting a stop within a polygon service area, according to an embodiment.

Referring to FIG. 7, the line setting device may provide a second interface 700 for setting a stop in a polygon service area 711. The second interface 700 may include at least one of a 2-1st area 710 and a 2-2nd area 720.

The polygon service area 711 set by the method described above with reference to FIG. 6 may be displayed on a map in the 2-1st area 710.

The line setting device may set a plurality of stops within the polygon service area 711. The line setting device may receive an input for selecting an arbitrary point within the polygon service area 711, and set the selected point as a stop 712.

The 2-2nd area 720 may include an input window for inputting stop information about the stop 712. The line setting device may set, through the 2-2nd area 720, at least one of a region, a service area, location information, a stop name, a map-indicated name, and a waiting time, as detailed information about the stop 712. In detail, an administrative district may be set as region information, a service area belonging to the administrative district may be set as service area information, coordinates of the stop 712 may be set as location information, a stop name to be displayed on a user terminal may be set as a map-indicated name, and a maximum stoppage duration for which a vehicle may be stopped at the stop 712 may be set as a waiting time.

Referring to FIG. 7, an arbitrary point in the polygon service area 711 may be selected as the stop 712, and the detailed information about the stop 712 may be set such that the region is 'Sejong City', the service area is 'Sejong City Region A', the coordinates are GPS (X/Y) values, the stop name is 'ABC Station Exit 1', the map-indicated name is '20 m in front of ABC Station Exit 1', and the waiting time is '1 minute'.

In an embodiment, the line setting device may recommend, based on a predefined criterion, a location within the polygon service area 711 in which a stop may be set. In detail, the line setting device may recommend a location within a polygon service area in which a stop may be set, based on information related to traffic in the polygon service area. For example, the traffic-related information may include hourly/day-of-week traffic volume, hourly/day-of-week vehicle demand, traffic signal, and lane information. The line setting device may recommend a point with a low traffic volume based on a hourly/day-of-week traffic volume, may recommend a point with high demand for ride-hailing based on hourly/day-of-week ride-hailing demand, may recommend a point at a preset distance from a traffic signal in order to be less affected by traffic signals, or may recommend a point where the number of lanes is greater than or equal to a preset number in order to prevent traffic obstruction.

Meanwhile, the line setting device may differently designate a waiting time range that may be set according to a vehicle-type product registered for the polygon service area 711. Vehicle-type products differ in vehicle size and thus differ in maximum stoppage duration for which the vehicle may be stopped at the stop 712 in order not to obstruct traffic. For example, in a case in which the vehicle-type product registered for the polygon service area 711 is a 5-seater DRT vehicle, the line setting device may designate the waiting time range such that the waiting time may be set between 1 minute and 10 minutes. On the other hand, in a case in which the vehicle-type product registered for the polygon service area 711 is a 16-seater minibus, the line setting device may designate the waiting time range so that the waiting time may be set between 1 and 2 minutes.

FIG. 8 is an exemplary diagram for describing a method of setting a line within a polygon service area by using a stop, according to an embodiment.

Referring to FIG. 8, the line setting device may provide a third interface 800 for setting a line within a polygon service area by using a stop. The third interface 800 may include at least one of a 3-1st area 810, a 3-2nd area 820, and a 3-3rd area 830.

A map including a polygon service area to which a line is to be designated may be displayed in the 3-1st area 810.

The 3-2nd area 820 may include an input window for setting basic information of a line. The line setting device may receive, through the 3-2nd area 820, an input for setting a service area, a vehicle-type product, a line name, and a line description. For example, the line setting device may set a vehicle-type product for traveling on a particular line as 'DRT'.

The 3-3rd area 830 may include an input window for setting a policy of a line. The line setting device may set, through the 3-3rd area 830, at least one of line type, route, time, and fare.

In detail, the line setting device may set the line type as a combination of a stop type and a route type. Stop types may be divided into FIXED STOP and FREE STOP, and route types may be divided into FIXED ROUTING and FREE ROUTING. For example, the combination of FIXED STOP and FIXED ROUTING refers to a line type in which the vehicle stops at only designated stops along a designated route, the combination of FIXED STOP and FREE ROUTING refers to a line type in which there is no designated route but the vehicle stops at only designated stops. the combination of FREE STOP and FIXED ROUTING refers to a line type in which the vehicle may stop anywhere within a designated route, and a combination of FREE STOP and FREE ROUTING refers to a line type in which the vehicle may freely move and stop in a designated polygon service area.

In addition, the line setting device may set a starting stop and an end stop of a line, and intermediate stops therebetween, for route setting. Detail descriptions of setting a route will be provided below with reference to FIGS. 9, 10A, and 10B.

In addition, the line setting device may set an operation time and a rest time of a particular line, for time setting.

Also, the line setting device may set a standard fare and a fare for each age group, for fare setting. In detail, the standard fare may include a basic fare and an additional fare. The fares for age groups may include an adult fare, a teenager rates, and a child fare.

Figure 9:
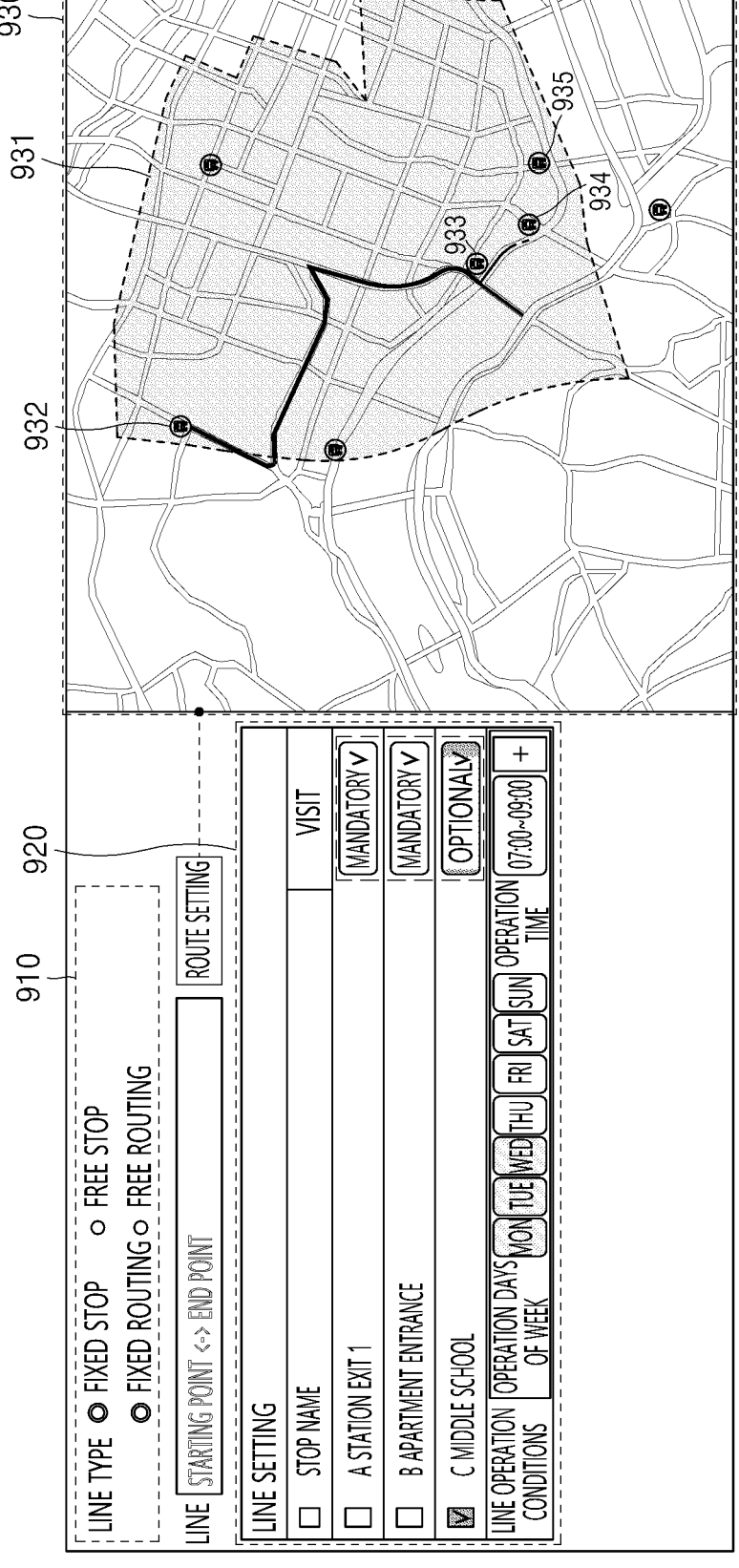
FIG. 9 is an exemplary diagram for describing a method of setting a line type of a line within a polygon service area, according to an embodiment.

FIG. 9 is an exemplary diagram for describing a method of setting a line type of a line within a polygon service area, according to an embodiment.

FIG. 9 illustrates at least a partial region of the input window for setting a policy of a line illustrated in the third interface 800 of FIG. 8.

The line setting device may set a line type 910 as a combination of a stop type and a route type. Stop types may be divided into FIXED STOP and FREE STOP, and route types may be divided into FIXED ROUTING and FREE ROUTING.

In response to receiving an input for selecting FIXED STOP as the stop type of the line type 910, the line setting device may enable stop selection 920. After the stop selection 920 is enabled, the line setting device may select at least one stop from among a plurality of stops included in a polygon service area 931.

In an embodiment, the line setting device may set operation conditions for each selected stop. The operation conditions may include operation days of week and operation times of a particular stop. The line setting device may recommend operation conditions of a particular stop, based on day-of-week/hourly boarding statistics of the stop.

In an embodiment, the line setting device may set a visit type of the selected at least one stop to any one of a mandatory-visit stop or an optional-visit stop. The line setting device may recommend a particular stop as an optional stop, based on operation conditions set for the stop and day-of-week/hourly boarding statistics of the stop.

Referring to FIG. 9, in response to receiving an input for selecting FIXED STOP as the stop type of the line type 910, the line setting device may enable selection of 'A Station Exit 1', 'B Apartment Entrance', and 'C Middle School', which are the plurality of stops included in the polygon service area 931. In addition, the line setting device may set operation conditions and a visit type for each stop.

In response to receiving an input for selecting FIXED ROUTING as the route type of the line type 910, the line setting device may enable route setting. After the route setting is enabled, the line setting device may receive an input for setting a route connecting at least one selected stop to each other, and set a line based on the received input.

Referring to FIG. 9, a fourth interface 930 may be provided in response to receiving an input for selecting the route setting. In the fourth interface 930, the polygon service area 931 may be displayed on a map, and stops 932 to 935 selected from among the plurality of stops included in the polygon service area 931 may be displayed.

The line setting device may set a route connecting the starting stop 932, the intermediate stops 933 and 934, and the end stop 935 to each other. When the route setting is completed, the line setting device may set a line including the stops and the route connecting the stops to each other. A detailed method of setting a route will be described below with reference to FIGS. 10A and 10B.

Meanwhile, in a case in which the stop type of the line type 910 is selected as FIXED STOP and the route type is selected as FREE ROUTING, the line setting device may enable only the stop selection 920 and maintain the route setting in a disabled state.

In addition, in a case in which the stop type of the line type 910 is selected as FREE STOP and the route type is selected as FIXED ROUTING, the line setting device may enable only the route setting and maintain the stop selection 920 in a disabled state.

Figure 10A:
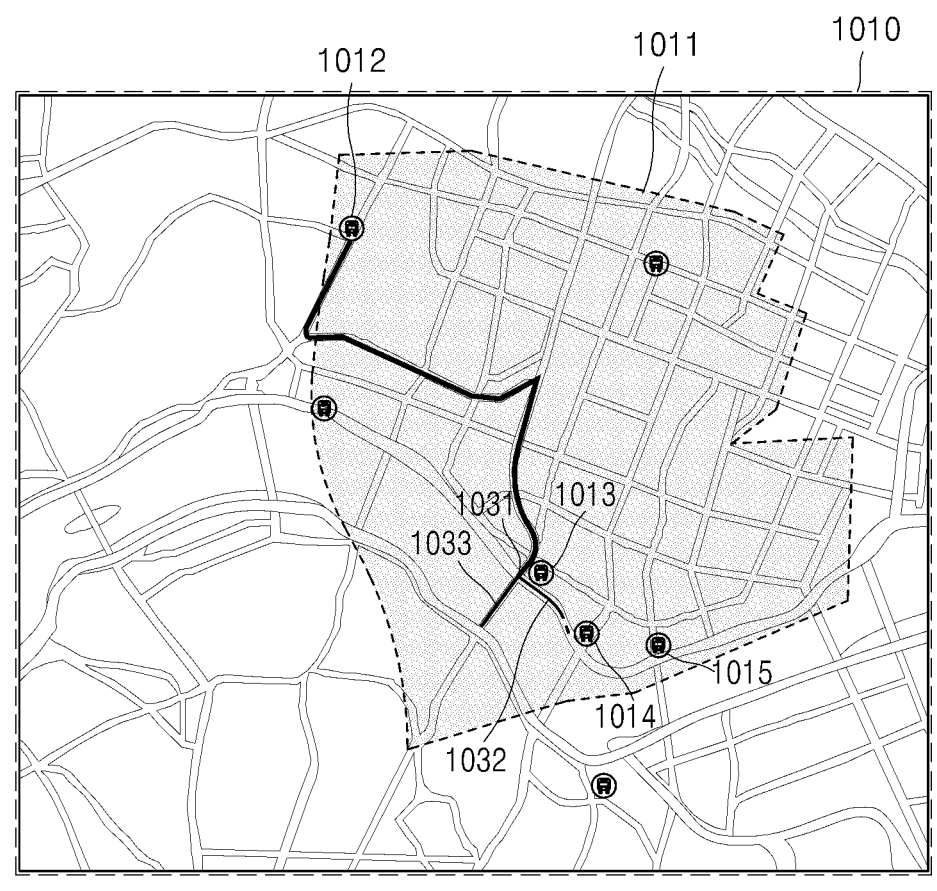
FIGS. 10A and 10B are exemplary diagrams for describing a method of setting a route according to an embodiment.
Figure 10B:
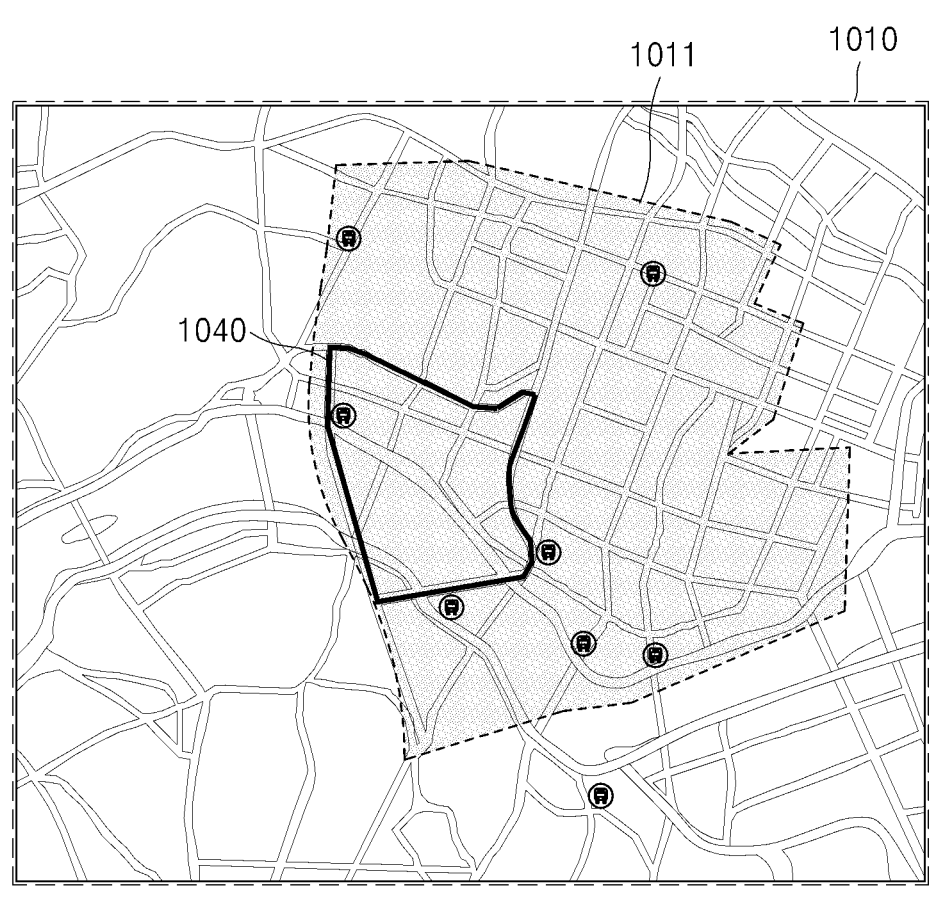

FIGS. 10A and 10B are exemplary diagrams for describing a method of setting a route according to an embodiment.

In response to receiving an input for selecting FIXED ROUTING as a route type of a line type, the line setting device may enable route setting. After the route setting is enabled, the line setting device may receive an input for setting a route connecting at least one selected stop to each other, and set a line based on the received input.

Referring to FIG. 10A, in response to receiving an input for selecting the route setting, the line setting device may provide a fourth interface 1010. In the fourth interface 1010, a polygon service area 1011 may be displayed on a map, and stops 1012 to 1015 selected from among a plurality of stops included in the polygon service area 1011 may be displayed.

The line setting device may set a route connecting the starting stop 1012, the intermediate stops 1013 and 1014, and the end stop 1015 to each other.

The line setting device may display a candidate route for setting a next route from a point 1031 at which route setting is completed.

In an embodiment, the candidate route may be determined in units of road identifiers (IDs). The line setting device may set road sections having the same road attribute information, with the same road ID. The road attribute information may include information such as the number of lanes, a traveling direction (e.g., straight, left turn, or right turn), an intersection, a stop line, and the like. For example, in a case in which roads between a first intersection and a second intersection have the same number of lanes, the roads between the first intersection and the second intersection may be assigned the same road ID. On the other hand, in a case in which the roads between the first intersection and the second intersection have different numbers of lanes, the roads between the first intersection and the second intersection may be assigned different road IDs.

In an embodiment, the line setting device may display two or more candidate routes for setting the next route at the point 1031 at which the line setting is completed. Referring to FIG. 10A, there may be a plurality of routes connecting the first intermediate stop 1013 to the second intermediate stop 1014. For example, the line setting device may display a first candidate route 1032 and a second candidate route 1033, as candidate routes for the point 1031 at which the line setting is completed. In response to receiving an input for selecting any one of the first candidate route 1032 and the second candidate route 1033, the line setting device may set the next route.

In an embodiment, the line setting device may determine that there are a plurality of candidate routes for setting the next route from the point 1031 at which the line setting is completed, and recommend any one route based on traffic-related information about each of the plurality of candidate routes. In detail, the line setting device may recommend any one route by comparing operation time information of the line currently being set, operation condition information of stops included in the line currently being set, and traffic-related information about each of the plurality of candidate routes. For example, in a case in which the line currently being set is operated only between 8:00 am and 11:00 am, the line setting device may recommend a candidate route with less traffic during the corresponding time period, from among the plurality of candidate routes.

In an embodiment, in a case in which a certain route among routes set for a first line overlaps a route of a second line, the line setting device may determine a detour route that may replace the certain route. The line setting device may recommend the detour route as a candidate route for setting the next route from the point at which the line setting is completed. In response to the detour route being selected, the line setting device may set the line by using the detour route.

In an embodiment, after setting the line, the line setting device may set the set line as any one of a round-trip line or a one-way line.

FIG. 10B illustrates an example in which a circular line is set. In a case in which a starting stop and an end stop of a set route are the same, the line setting device may determine a line including the corresponding route as a circular line. The line setting device may provide a message indicating that the set line is a circular line.

FIG. 11 is an exemplary diagram for describing a method of allocating a vehicle to a set line according to an embodiment.

The line setting device may allocate a vehicle to a line that is set through the method described above. Referring to FIG. 11, the line setting device may provide a fourth interface 1100 for allocating a vehicle to a set line. The fourth interface 1100 may include a 4-1st area 1110 and a 4-2nd area 1120.

A plurality of operational vehicles registered in a database may be displayed in the 4-1st area 1110. Referring to FIG. 6, the line setting device may set a vehicle-type product that is operable in a certain polygon service area. The line setting device may identify, among the plurality of operational vehicles registered in the database, vehicles corresponding to a vehicle-type product that is operable in the polygon service area. Referring to FIG. 11, the line setting device may determine that the vehicle-type product that is operable in the polygon service area is 'BUS', and disable vehicles whose vehicle-type product is not 'BUS', among the plurality of operational vehicles.

The line setting device may allocate at least some of the identified vehicles to the set line. Referring to FIG. 11, among identified vehicle IDs 0001 to 0005, the vehicle IDs 0001 to 0003 are allocated to the set line.

In an embodiment, the line setting device may obtain an allocation request time for allocating a vehicle to the set line. The line setting device may determine whether the identified vehicle may be allocated to the set line by comparing the allocation request time with a possible operation duration of the identified vehicle.

Figure 12:
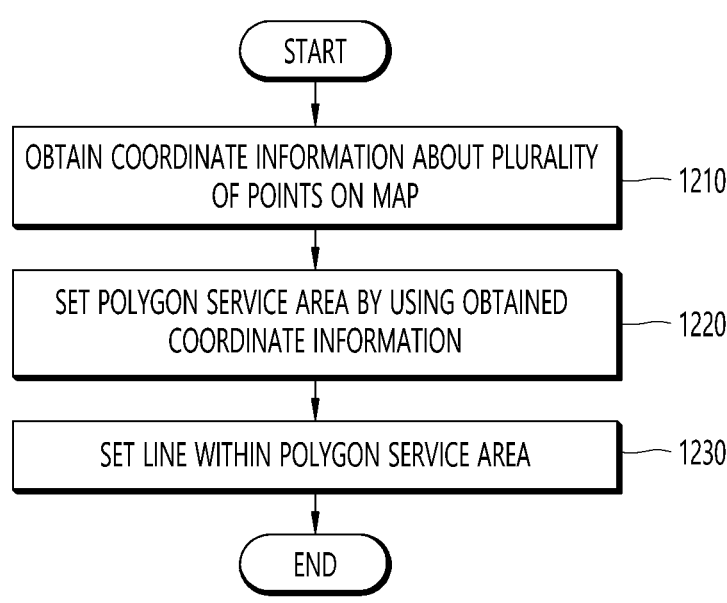
FIG. 12 is a flowchart for describing a method of setting a line within a polygon service area according to an embodiment.

FIG. 12 is a flowchart for describing a method of setting a line within a polygon service area according to an embodiment.

Referring to FIG. 12, in operation 1210, the line setting device may obtain coordinate information about a plurality of points on a map.

In an embodiment, the line setting device may specify a plurality of points on a map, and obtain coordinate information corresponding to the specified plurality of points.

In operation 1220, the line setting device may set a polygon service area by using the obtained coordinate information.

In an embodiment, the line setting device may register a vehicle-type product that is operable in the polygon service area. In response to receiving an input for searching for a certain vehicle-type product, the line setting device may output a polygon service area registered with the certain vehicle-type product, among a plurality of set polygon service areas.

In operation 1230, the line setting device may set a line within the polygon service area.

In an embodiment, the line setting device may set a stop within the polygon service area. In addition, the line setting device may set a line within the polygon service area by using stops.

In an embodiment, the line setting device may recommend a location within the polygon service area in which a stop may be set, based on information related to traffic in the polygon service area.

In an embodiment, the line setting device may set a maximum waiting time for which a vehicle may be stopped at a stop.

In an embodiment, the line setting device may set the line type of the line as a combination of a stop type and a route type. Stop types may include FIXED STOP and FREE STOP, and route types may include FIXED ROUTING and FREE ROUTING.

In an embodiment, the line setting device may set a fare of the line as a standard fare and a fare for each age group.

In an embodiment, in response to receiving an input for selecting FIXED STOP as the stop type of the line type, the line setting device may enable stop selection. The line setting device may select at least one stop from among a plurality of stops included in the polygon service area. The line setting device may set the line based on the selected at least one stop.

In an embodiment, a visit type of the selected at least one stop may be set to any one of a mandatory-visit stop or an optional-visit stop.

In an embodiment, in response to receiving an input for selecting FIXED ROUTING as the route type of the line type, the line setting device may enable route setting. The line setting device may receive an input for setting a route connecting the at least one selected stop to each other, and set the line based on the received input.

In an embodiment, the line setting device may determine that there are a plurality of candidate routes for setting a next route from a point at which line setting is completed, and recommend any one route based on traffic-related information about each of the plurality of candidate routes.

In an embodiment, in a case in which a certain route among set routes overlaps a route of another line, the line setting device may determine a detour route that may replace the certain route, and set the line by using the detour route.

In an embodiment, in a case in which a starting stop and an end stop of the set route are the same, the line setting device may determine the line including the set route as a circular line.

In an embodiment, the line setting device may allocate a vehicle to a set line. The line setting device may identify, from among a plurality of operational vehicles registered in a database, vehicles corresponding to a set vehicle-type product, and allocate at least some of the identified vehicles to the set line.

In an embodiment, the line setting device may obtain an allocation request time for allocating a vehicle to a set line, and determine whether the identified vehicle may be allocated to the set line by comparing the allocation request time with a possible operation duration of the identified vehicle.

Figure 13:
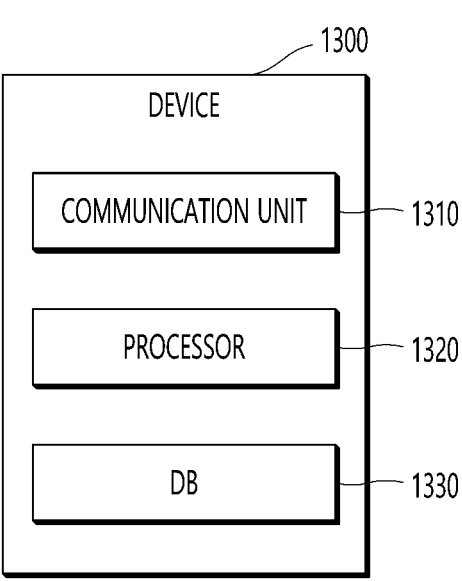
FIG. 13 is a block diagram of a line setting device according to an embodiment.

FIG. 13 is a block diagram of a line setting device according to an embodiment.

Referring to FIG. 13, a line setting device 1300 may include a communication unit 1310, a processor 1320, and a database (DB) 1330. FIG. 13 illustrates the line setting device 1300 including only the components related to an embodiment. Therefore, it would be understood by those of skill in the art that other general-purpose components may be further included in addition to those illustrated in FIG. 13.

The communication unit 1310 may include one or more components for performing wired/wireless communication with an external server or an external device. For example, the communication unit 1310 may include at least one of a short-range communication unit (not shown), a mobile communication unit (not shown), and a broadcast receiver (not shown).

The DB 1330 is hardware for storing various pieces of data processed by the line setting device 1300, and may store a program for the processor 1320 to perform processing and control.

The DB 1330 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1320 controls the overall operation of the line setting device 1300. For example, the processor 1320 may execute programs stored in the DB 1330 to control the overall operation of an input unit (not shown), a display (not shown), the communication unit 1310, the DB 1330, and the like. The processor 1320 may execute programs stored in the DB 1330 to control the operation of the line setting device 1300.

The processor 1320 may control at least some of the operations of the line setting device 1300 described above with reference to FIGS. 1 to 12.

The processor 1320 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the line setting device 1300 may be a mobile electronic device. For example, the line setting device 1300 may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the line setting device 1300 may be implemented as a wearable device having a communication function and a data processing function, such as a watch, glasses, a hair band, a ring, or the like.

In another embodiment, the line setting device 1300 may be an electronic device embedded in a vehicle. For example, the line setting device 1300 may be an electronic device that is manufactured and then inserted into a vehicle through tuning.

As another embodiment, the line setting device 1300 may be a server located outside a vehicle. The server may be implemented as a computer device or a plurality of computer devices that provide a command, code, a file, content, a service, and the like by performing communication through a network. The server may receive data necessary for determining a moving path of the vehicle from devices mounted on the vehicle, and determine the moving path of the vehicle based on the received data.

In another embodiment, a process performed by the line setting device 1300 may be performed by at least some of a mobile electronic device, an electronic device embedded in the vehicle, and a server located outside the vehicle.

Embodiments of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skill in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program products may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to the present disclosure, there may be provided an interface for conveniently and efficiently setting a service area, stops, and a line.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of setting a line within a polygon service area, the method comprising:

obtaining coordinate information about a plurality of points on a map;

setting a polygon service area by using the obtained coordinate information;

setting a stop in the polygon service area, wherein the setting the stop comprises:

recommending a point where a traffic volume is lower than or equal to a preset traffic volume based on hourly traffic volume, recommending a point where a ride-hailing vehicle demand is higher than or equal to a preset ride-hailing vehicle demand based on hourly ride-hailing vehicle demand, recommending a point at a preset distance from a traffic signal, or recommending a point at where a number of lanes is greater than or equal to a preset number as a location within the polygon service area in which the stop is settable based on information related to traffic within the polygon service area, setting the stop base on the recommended location within the polygon service area;

setting a line using the stop within the polygon service area, wherein the setting the line comprises:

setting a route type of the line to one of FIXED ROUTING and FREE ROUTING, in response to receiving a route type-selecting input for selecting FIXED ROUTING as a route type of the line, enabling route setting, and receiving a route-connecting input for setting a route connecting at least one selected stop among a plurality of stops set within the polygon service area, and setting the line based on the received route-connecting input, wherein the setting the line based on the received route-connecting input comprises recommending one route from among a plurality of candidate routes for setting a next route from a point at which setting of the route is completed, based on at least one of the information related to traffic, operation time information of the line, and operation condition information of stops included in the line about each of the plurality of candidate routes, wherein the information related to traffic includes at least one of traffic volume, vehicle demand, traffic signal, and lane information in the polygon service area, wherein the plurality of candidate routes are determined in units of road identifiers (IDs) set based on road attribute information; and controlling movement of a vehicle to autonomously drive along the set line.

2. The method of claim 1, wherein the obtaining of the coordinate information comprises specifying the plurality of points on the map, and obtaining the coordinate information corresponding to the specified plurality of points.

3. The method of claim 1, wherein the setting of the polygon service area comprises registering a vehicle-type product that is operable in the polygon service area, and the method further comprises, in response to receiving an input for searching for a certain vehicle-type product, outputting, from among a plurality of set polygon service areas, a polygon service area in which the certain vehicle-type product is registered.

4. The method of claim 1, wherein controlling the vehicle to drive through the line comprises generating control signal which can control the vehicle to drive through the line.

5. The method of claim 1, wherein the setting of the stop further comprises setting a maximum waiting time for which a vehicle is able to be stopped at the stop.

6. The method of claim 1, wherein the setting of the line comprises setting a stop type of the line, and the stop type comprises FIXED STOP and FREE STOP.

7. The method of claim 1, wherein the setting of the line comprises setting the set line as any one of a round-trip line or a one-way line.

8. The method of claim 6, wherein the setting of the line comprises:

in response to receiving an input for selecting FIXED STOP as the stop type of a type of the line, enabling stop selection;

selecting at least one stop from among a plurality of stops included in the polygon service area; and setting the line based on the selected at least one stop.

9. The method of claim 8, wherein a visit type of the selected at least one stop is set to any one of a mandatory-visit stop or an optional-visit stop.

10. The method of claim 1, wherein the setting of the line further comprises:

based on a particular route in the set route overlapping a route of another line, determining a detour route that is able to replace the particular route; and setting the line by using the detour route.

11. The method of claim 1, wherein the setting of the line further comprises, based on a starting stop and an end stop of the set route being identical to each other, determining the line comprising the corresponding route as a circular line.

12. The method of claim 3, further comprising allocating a vehicle to the set line, wherein the allocating of the vehicle comprises:

identifying, from among a plurality of operational vehicles registered in a database, vehicles corresponding to the set vehicle-type product; and allocating at least some of the identified vehicles to the set line.

13. The method of claim 12, wherein the allocating of the vehicle further comprises:

obtaining an allocation request time for allocating a vehicle to the set line; and determining whether the identified vehicles are allocable to the set line by comparing the allocation request time with possible operation durations of the identified vehicles.

14. A device for setting a line within a polygon service area, the device comprising:

a memory storing at least one program; and a processor configured to executing the at least one program to perform an operation, wherein the processor is further configured to obtain coordinate information about a plurality of points on a map, set a polygon service area by using the obtained coordinate information, set a stop in the polygon service area and set a line within the polygon service area using the stop, wherein the setting the stop comprises:

recommending a point where a traffic volume is lower than or equal to a preset traffic volume based on hourly traffic volume, recommending a point where a ride-hailing vehicle demand is higher than or equal to a preset ride-hailing vehicle demand based on hourly ride-hailing vehicle demand, recommending a point at a preset distance from a traffic signal, or recommending a point at where a number of lanes is greater than or equal to a preset number as a location within the polygon service area in which the stop is settable based on information related to traffic within the polygon service area, and setting the stop base on the recommended location within the polygon service area, wherein the setting the line comprises:

setting a route type of the line to one of FIXED ROUTING and FREE ROUTING, in response to receiving a route type-selecting input for selecting FIXED ROUTING as a route type of the line, enabling route setting, and receiving a route-connecting input for setting a route connecting at least one selected stop among a plurality of stops set within the polygon service area, and setting the line based on the received route-connecting input, wherein the setting the line based on the received route-connecting input comprises recommending one route from among a plurality of candidate routes for setting a next route from a point at which setting of the route is completed, based on at least one of the information related to traffic, operation time information of the line, and operation condition information of stops included in the line about each of the plurality of candidate routes, wherein the information related to traffic includes at least one of traffic volume, vehicle demand, traffic signal, and lane information in the polygon service area, wherein the plurality of candidate routes are determined in units of road identifiers (IDs) set based on road attribute information, and

wherein the processor is further configured to control movement of a vehicle to autonomously derive along the set line.

15. A non-transitory computer-readable recording medium having recorded thereon a program for causing a computer to execute the method of claim 1.

* * * * *